US012628131B2

(12) United States Patent
Ji et al.

(10) Patent No.: US 12,628,131 B2
(45) Date of Patent: May 12, 2026

(54) RESOURCE SELECTION METHOD AND DEVICE

(71) Applicant: VIVO MOBILE COMMUNICATION CO., LTD., Dongguan (CN)

(72) Inventors: Zichao Ji, Dongguan (CN); Shuyan Peng, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 492 days.

(21) Appl. No.: 17/955,496

(22) Filed: Sep. 28, 2022

(65) Prior Publication Data

US 2023/0015403 A1     Jan. 19, 2023

Related U.S. Application Data

(63) Continuation of application No. PCT/CN2021/083892, filed on Mar. 30, 2021.

(30) Foreign Application Priority Data

Mar. 30, 2020     (CN) ......................... 202010238961.1

(51) Int. Cl.
*H04W 72/04* (2023.01)

(52) U.S. Cl.
CPC .................................. *H04W 72/04* (2013.01)

(58) Field of Classification Search
None
See application file for complete search history.

(56) References Cited

U.S. PATENT DOCUMENTS

| | | | | |
|---|---|---|---|---|
| 11,297,604 B2 * | 4/2022 | Wu | ........................ | H04W 72/02 |
| 12,167,367 B2 * | 12/2024 | Ali | ........................ | H04W 72/30 |
| 2013/0308551 A1 | 11/2013 | Madan et al. | | |
| 2014/0081967 A1 * | 3/2014 | Morris | .................. | G06F 16/907 |
| | | | | 707/736 |
| 2018/0092129 A1 | 3/2018 | Guo et al. | | |
| 2018/0160347 A1 * | 6/2018 | Chen | ..................... | H04W 28/26 |
| 2019/0037410 A1 * | 1/2019 | Yan | ........................ | H04W 72/02 |
| 2019/0140807 A1 * | 5/2019 | Wang | .................... | H04L 1/1614 |
| 2019/0191381 A1 * | 6/2019 | Zhang | .................. | H04W 52/42 |
| 2019/0246249 A1 | 8/2019 | Lee et al. | | |
| 2019/0394786 A1 | 12/2019 | Parron et al. | | |
| 2020/0260231 A1 * | 8/2020 | Ganesan | .............. | H04B 7/0695 |

(Continued)

FOREIGN PATENT DOCUMENTS

| | | |
|---|---|---|
| CN | 106416405 A | 2/2017 |
| CN | 107277922 A | 10/2017 |

(Continued)

OTHER PUBLICATIONS

Second Office Action issued in related Chinese Application No. 202010238961.1, mailed Apr. 19, 2024, 8 pages.

(Continued)

*Primary Examiner* — Xavier S Wong
(74) *Attorney, Agent, or Firm* — IPX PLLC

(57)     ABSTRACT

A resource selection method and a device are provided. The method is performed by a user equipment. The method comprises determining a first resource set. The first resource set is a subset of a second resource set. The method further comprises selecting a target resource according to the first resource set.

18 Claims, 4 Drawing Sheets

(56)                    References Cited

U.S. PATENT DOCUMENTS

2021/0050979 A1 *   2/2021  Hui ....................... H04W 72/02
2021/0282115 A1 *   9/2021  Sengupta .............. H04L 5/0053
2023/0353304 A1 *  11/2023  Wu ....................... H04L 5/0023
2023/0413299 A1 *  12/2023  Lee ....................... H04W 28/26

FOREIGN PATENT DOCUMENTS

CN        110708144  A      1/2020
WO       2018082031  A1     5/2018
WO       2019195151  A1    10/2019

OTHER PUBLICATIONS

TCL Communication, "Physical Layer Procedures for Sidelink", 3GPP TSG RAN WG1 Meeting #98, R1-1908279, mailed Aug. 2019, 14 pages.
Extended European Search Report issued in related European Application No. 21781786.5, mailed Oct. 2, 2023, 8 pages.
First Office Action issued in related Chinese Application No. 202010238961.1, mailed Oct. 27, 2023, 8 pages.
International Search Report issued in corresponding International Application No. PCT/CN2021/083892, mailed Jun. 22, 2021, 4 pages.
Huawei, Hisilicon. Sidelink resource allocation mode 2 for NR V2X, 3GPP TSG RAN WG1 Meeting #97, R1-1906011, May 3, 2019, 13 pages.

\* cited by examiner

RESOURCE SELECTION METHOD AND DEVICE

CROSS-REFERENCE TO RELATED APPLICATIONS

This application is a continuation of International Application No. PCT/CN2021/083892, filed on Mar. 30, 2021, which claims priority to Chinese Patent Application No. 202010238961.1, filed on Mar. 30, 2020. The entire contents of each of the above-referenced applications are expressly incorporated herein by reference.

TECHNICAL FIELD

The present disclosure relates to the technical field of communications, and in particular, to a resource selection method and device.

BACKGROUND

In the New Radio (NR) technology, there are two NR sidelink (SL) resource allocation modes. One is based on base station scheduling (mode 1), and the other is based on autonomous resource selection of a user equipment (UE) (mode 2).

In the resource allocation mode based on the base station scheduling, a sidelink resource used by the UE for data transmission is determined by a base station, and a transmitter (Tx) UE is notified through downlink signaling. In the resource allocation mode based on autonomous selection of a UE, the UE selects an available transmission resource in a (pre-) configured resource pool. The UE first performs channel monitoring before selecting a resource, then selects a resource set with less interference according to a channel monitoring result, and subsequently selects a resource for transmission from the resource set randomly.

However, in a solution based on the autonomous resource selection of the UE, for groupcast communication of a sidelink, that is, transmission of information from one UE to other in-group UEs, when sending information, the UE cannot receive information sent by other in-group UEs, which generally causes relatively low reliability of a transmission resource.

SUMMARY

According to a first aspect, the embodiments of the present disclosure provide a resource selection method, which is applied to the user equipment, and includes:

determining a first resource set, where the first resource set is a subset of a second resource set; and selecting a target resource according to the first resource set.

According to a second aspect, the embodiments of the present disclosure further provide a user equipment, including:

a determining module, configured to determine a first resource set, where the first resource set is a subset of a second resource set; and a processing module, configured to select a target resource according to the first resource set.

According to a third aspect, the embodiments of the present disclosure further provide a user equipment, including a processor, a memory, and a computer program stored on the memory and executable on the processor, where the computer program, when executed by the processor, implements the steps of the foregoing resource selection method.

According to a fourth aspect, the embodiments of the present disclosure further provide a computer-readable storage medium, storing a computer program, where the computer program, when executed by a processor, implements the steps of the foregoing resource selection method.

DETAILED DESCRIPTION

Detailed description is made below with reference to the accompanying drawings and specific embodiments. For ease of description, the symbol '/' below is equivalent to or.

The method in the embodiments of the present disclosure is applied to a user equipment. The UE may refer to an access terminal, a subscriber unit, a subscriber station, a mobile station, a mobile console, a remote station, a remote terminal, a mobile device, a user terminal, a terminal, a wireless communications device, a user agent, or a user apparatus. A terminal device may further be a cellular phone, a cordless phone, a Session Initiation Protocol (SIP) phone, a Wireless Local Loop (WLL) station, a Personal Digital Assistant (PDA), a handheld device having a wireless communication function, a computer device, another processing device connected to a wireless modem, in-vehicle device, or a wearable device.

Figure 1:
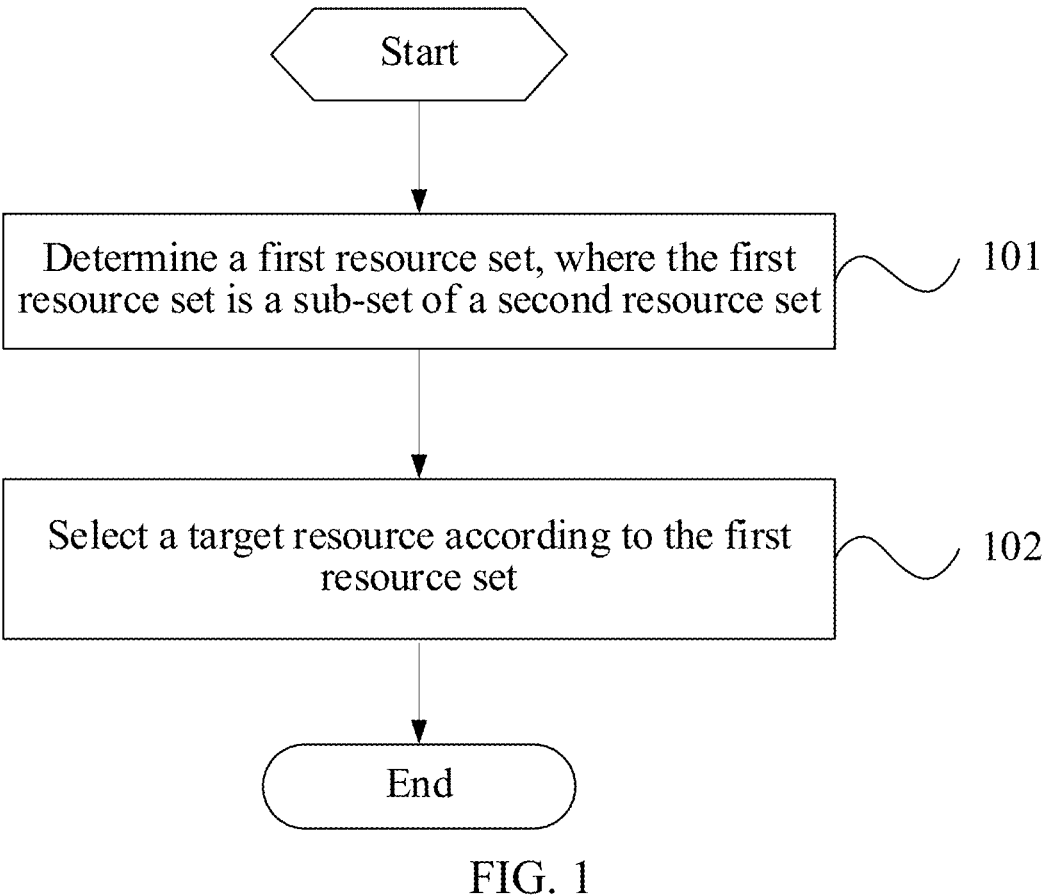
FIG. 1 is a schematic flowchart of a resource selection method according to an embodiment of the present disclosure.

As shown in FIG. 1, a resource selection method provided by the embodiments of the present disclosure is applied to the user equipment, and includes the following steps:

Step 101. Determine a first resource set, where the first resource set is a subset of a second resource set.

In some embodiments, the second resource set is a resource set that is specified in a protocol, or pre-configured, or configured by a target node, or dynamically indicated by a target node, where the target node may be a control node or a transmission node (for example, a peer device for transmission with the user equipment). In this way, since the first resource set determined in this step is a subset of the second resource set, selection of a transmission resource may be carried out in a smaller range.

Step 102. Select a target resource according to the first resource set.

In this step, after the subset of the second resource set is determined in step 101, the target resource is further selected according to the first resource set.

In this way, according to the foregoing step 101 and step 102 in the method of the embodiments of the present disclosure, during autonomous resource selection, the user equipment, by determining the first resource set that is a subset of the second resource set, can avoid a resource selection conflict and improve reliability of communications when selecting the target resource according to the first resource set.

The second resource set may be one or more carriers, one or more Bandwidth Parts (BWPs), or all or partial resources of one or more resource pools. In some embodiments, the second resource set is a resource set selected by or allocated to a UE group to which the user equipment belongs, for example, a set of resources in the resource pool selected and used by the UE in a UE group, or a set of resources allocated by the control node to a UE group, or a set of resources selected by a group head UE in a UE group.

In this embodiment, the first resource set is a subset of the second resource set divided based on at least one of the following parameters:

a subset size;

a start position;

a target quantity; or a period.

The subset size is a time-frequency granularity and/or a frequency granularity of a subset of the second resource set. The start position is a starting point of a subset of the second resource set. The target quantity is a total quantity of subsets of the second resource set. The period is a total length of one subset and one subset interval of the second resource set. Taking the second resource set being a resource pool as an example, for a subset divided from the resource pool, the subset size is a time-frequency granularity and/or a frequency granularity of the subset. A time-domain granularity may be one or more slots, one or more sub-slots, one or more logical slots, or one or more logical sub-slots; a frequency-domain granularity is a bandwidth of the resource pool, one or more sub channels, or one or more Physical Resource Blocks (PRBs). The start position is a time and/or a frequency start position of a subset of the second resource set. The target quantity may be a quantity of time-domain and/or frequency-domain subsets.

In some embodiments, the at least one parameter is specified in a protocol, or pre-configured, or configured by a control node, or indicated by a control node, or determined based on a first preset policy.

The configuration may be implemented through high layer signaling, for example, a Radio Resource Control (RRC) signaling, sidelink radio resource control (PC5-RRC) signaling, or sidelink radio resource control (PC5-S) signaling, or the like. The control node indication may be a dynamic indication through physical layer signaling or partial high layer signaling, for example, Downlink Control Information (DCI), Sidelink Control Information (SCI), or a Media Access Control layer Control Element (MAC CE). The control node may be a base station, a group head of the UE group, a Remote Subscriber Unit (RSU), or a relay device (e.g., relay UE), or the like.

In this embodiment, for implementation of determining the parameter by the first preset policy, the first preset policy includes at least one of the following content items:

group information of the user equipment;

a quantity of sidelink radio resource control connections of the user equipment; or a size of to-be-transmitted data of the user equipment.

In this way, the parameter may be determined according to the group information of the UE. If the group information indicates a quantity of in-group UEs, the target quantity of subsets divided from the second resource set is obtained. The target quantity is equal to the quantity of the in-group UEs, or is an integer multiple of the quantity of the in-group UEs. The parameter may be determined according to the quantity of UE PC5-RRC connections of the user equipment. For example, for a UE1, the target quantity of subsets divided from the second resource set is equal to the quantity of PC5-RRC connections of the UE1, or a quantity of all PC5-RRC connections in the group to which the UE1 belongs. The parameter may further be determined according to the size of to-be-transmitted data (for example, a quantity of PRBs, or a quantity of sub-channels) of the UE. For example, a frequency-domain granularity/length may be determined according to the quantity of sub-channels of the to-be-transmitted data. In this way, when different sizes of resources are allocated depending on different transmission requirements, allocation fragments of the resources can be reduced, thereby improving utilization.

In addition, in this embodiment, each subset of the second resource set has a corresponding index number.

In some embodiments, a quantity of the index numbers is equal to a quantity of the subsets of the second resource set; or the quantity of the index numbers is specified in a protocol, or pre-configured, or configured by a control node, or indicated by a control node, or determined based on a second preset policy.

If the quantity of the index numbers is equal to the quantity of the subsets of the second resource set, the index numbers and the subsets correspond to each other in a one-to-one manner. In this case, for the time-domain/frequency-domain, the index numbers may be numbered in a sequence of an increasing/decreasing direction of the time-frequency, with the time-domain followed by the frequency-domain, or the frequency-domain followed by the time-domain. Other number forms are not excluded. Therefore, the index number may be computed by using the following preset formulas. For example, the subset size of the second resource set takes one logical slot, or one logical slot, or a plurality of logical slots, or a plurality of slots as a time-domain unit, and/or takes one sub-channel or a plurality of sub-channels as a frequency-domain unit:

$$\text{index number} = X \bmod N;$$

$$\text{index number} = Y \bmod M;$$

$$\text{index number} = (Y \bmod M) * N + (X \bmod N); \text{ and}$$

$$\text{index number} = (X \bmod N) * M + (Y \bmod M);$$

X is a logical slot or slot index of a current subset, and X may be a rounded-up or rounded-down value of a quotient obtained by dividing the logical slot or slot index of the current subset by the frequency-domain granularity of the subset. Y is a sub-channel index of the current subset, or r a rounded-up or rounded-down value of a quotient obtained by dividing the sub-channel index by the frequency-domain granularity of the subset. N is a time-domain length of the subset in the second resource set, and M is the frequency-domain length of the subset in the second resource set.

In this embodiment, for implementation of determining the index number by the second preset policy, the second preset policy includes at least one of the following content items:

the group information of the user equipment; or the quantity of the subsets of the second resource set.

In this way, the index number may be determined according to the group information of the UE. If the group information indicates the quantity of the in-group UEs, the quantity of the index numbers is obtained. The quantity of the index numbers is equal to the quantity of the in-group UEs, or is an integer multiple of the quantity of the in-group UEs. Therefore, the index number of the subset is repeatedly numbered according to the quantity of the index numbers. The index numbers may be determined according to the quantity of the subsets of the second resource set. For example, according to the quantity of the subsets of the second resource set, an operation such as truncation, repeat extension, or loop is performed on the quantity of the index numbers.

In addition, in this embodiment, step 101 includes:

determining the first resource set based on at least one piece of the following information:

an in-group identity ID of the user equipment;

a source ID of the user equipment;

a destination user equipment ID;

time information;

a sidelink network ID;

geographic location information; or a resource pool ID.

To ensure that sending time periods/frequencies of the in-group UEs do not overlap, the first resource set may be selected according to one of the in-group ID (also known as a member ID) and the source ID of the user equipment. For example:

the index number of the first resource set=in-group ID mod the quantity of the subsets/the quantity of the index numbers;

the index number of the first resource set=in-group ID; or the index number of the first resource set satisfies the following condition: the index number of the first resource set mod the quantity of the in-group UEs=in-group ID.

A correspondence between the index numbers of the subsets of the second resource set and the in-group IDs may be specified in a protocol, or pre-configured, or configured by a control node, and the first resource set is selected according the correspondence.

To achieve an objective of in-group UE/inter-group UE interference randomization, the first resource set may be selected according to the source ID of the user equipment, the destination user equipment ID (e.g., Destination ID), the time information (such as a sidelink system frame number (DFN), a System Frame Number (SFN), a logical slot number, a slot number, or the like), a sidelink Synchronization Signal (SLSS) ID, the geographic location information (such as a zone ID, or a cell ID, or the like), the resource pool ID, or the like. For example:

the index number of the first resource set=K mod the quantity of the subsets or the index numbers, where K is one of the source ID, the destination ID, the DFN, the SFN, the logical slot number, the slot number, the SLSS ID, the zone ID, and the cell ID.

In some embodiments, the first resource set is selected according to a variety of information. For example:

the index number of the first resource set=[(ID1 mod the quantity of the subsets or the index numbers)+(ID2 mod the quantity of the subsets or the index numbers)] mod the quantity of the subsets or the index numbers; and the index number of the first resource set=(ID1+ID2) mod (a quantity of sub-resources or the quantity of the index numbers);

where ID1 is the in-group ID or the source ID, and ID2 is the source ID, the destination ID, the DFN, the SFN, the logical slot number, the slot number, the SLSS ID, the zone ID, or the cell ID.

A subset may also be randomly selected from the subsets of the second resource set as the first resource set.

It should be learned that, in this embodiment, the foregoing IDs each may be a part of an actual ID, such as some Least Significant Bits (LSBs), or Most Significant Bits (MSBs) of all ID bits.

After determining the first resource set, the UE may randomly select the target resource in the first resource set for transmission. However, considering transmission reliability, in this embodiment, step 102 includes:

determining a resource selection window;

determining a third resource set according to the first resource set and the resource selection window; and selecting the target resource from the third resource set.

Herein, the resource selection window is first determined, and then the third resource set, which is used as a candidate resource set, is further determined according to the resource selection window and the determined first resource set. Finally, the target resource is selected from the third resource set. Selecting the target resource from the third resource set can avoid overlapping or interference with resources of other UEs more effectively, thereby achieving better transmission reliability.

After selecting the target resource, step 102 further includes:

sending data on the target resource according to a power control parameter corresponding to the first resource set.

For example, the data is sent on the target resource according to the power control parameter corresponding to the first resource set, such as an initial power P0/a pass loss adjustment factor alpha; and the data is dynamically sent on the target resource according to the power control parameter corresponding to the first resource set, such as an incremental value of a transmit power, an incremental value of a Power Spectral Density (PSD), or an incremental value of Energy Per Resource Element (EPRE).

Application of the method in the embodiments of the present disclosure is described below with reference to a specific scenario:

In the current scenario, UE-A, UE-B and UE-C are UEs in the same group, where the member ID of the UE-A is #2, the member ID of the UE-B is #3, and the member ID of the UE-C is #4. The resource pool (that is, the second resource set) is divided into 8 subsets, and the index numbers are #1 to #8.

Figure 2:
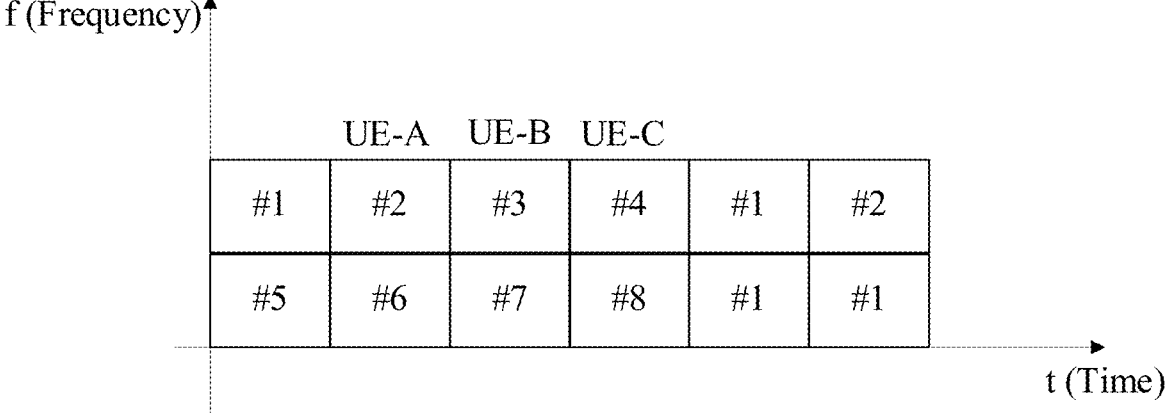
FIG. 2 is an application diagram 1 of a resource selection method according to an embodiment of the present disclosure.

If the UE selects a matching first resource set based on the formula: the index number=the in-group ID mod the quantity of the subsets, as shown in FIG. 2, the first resource set of the UE-A is the subset #2 of the resource pool, the first resource set of the UE-B is the subset #3 of the resource pool, and the first resource set of the UE-C is the subset #4 of the resource pool.

Figure 3:
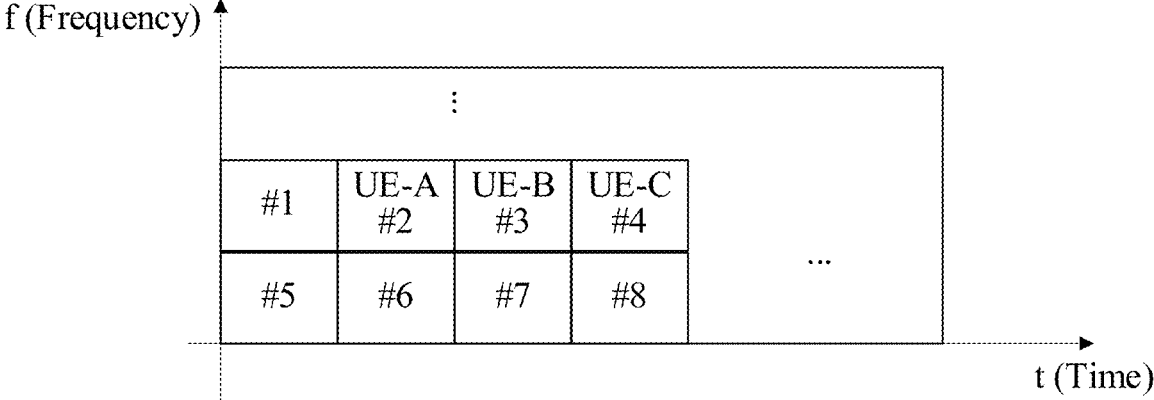
FIG. 3 is an application diagram 2 of a resource selection method according to an embodiment of the present disclosure.

Division of the subsets may be determined based on a resource set occupied by the UE group. As shown in FIG. 3, the resource set is divided into 8 subsets, and the index numbers thereof are #1 to #8. The UE selects a matching subset based on the formula: the index number=the in-group ID mod the quantity of the subsets.

In summary, in the method in the embodiments of the present disclosure, during autonomous resource selection, the user equipment, by determining the first resource set that is a subset of the second resource set, can avoid a resource selection conflict and improve reliability of communications when selecting the target resource according to the first resource set.

Figure 4:
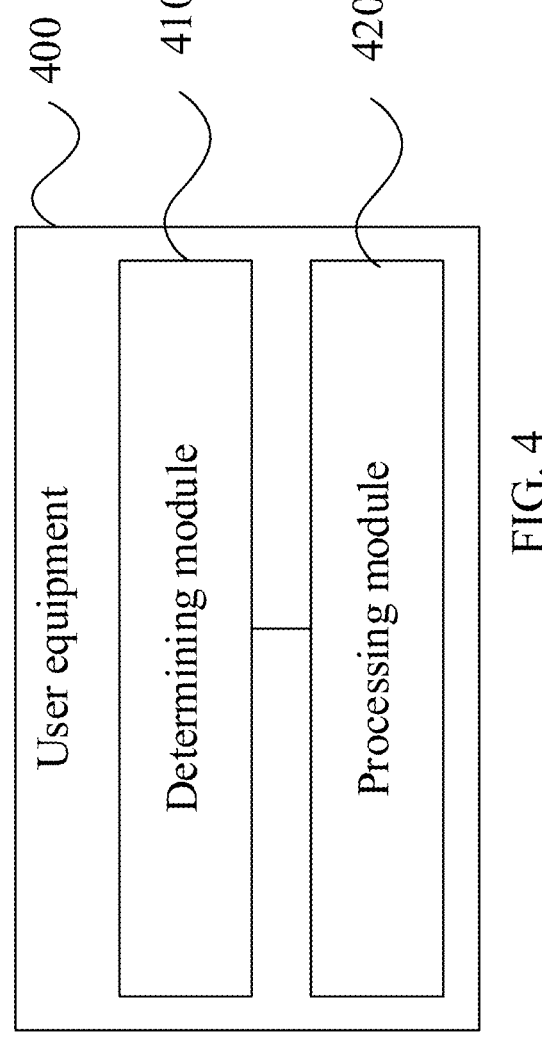
FIG. 4 is a schematic structural diagram of a user equipment according to an embodiment of the present disclosure.

FIG. 4 is a block diagram of a user equipment according to an embodiment of the present disclosure. A user equipment 400 shown in FIG. 4 includes a determining module 410 and a processing module 420.

The determining module 410 is configured to determine a first resource set, where the first resource set is a subset of a second resource set; and the processing module 420 is configured to select a target resource according to the first resource set.

In some embodiments, the first resource set is a subset of the second resource set divided based on at least one of the following parameters:

a subset size;

a start position;

a target quantity; or a period.

In some embodiments, the at least one parameter is specified in a protocol, or pre-configured, or configured by a control node, or indicated by a control node, or determined based on a first preset policy.

In some embodiments, the first preset policy includes at least one of the following content items:

group information of the user equipment;

a quantity of sidelink radio resource control connections of the user equipment; or a size of to-be-transmitted data of the user equipment.

In some embodiments, each subset of the second resource set has a corresponding index number.

In some embodiments, a quantity of the index numbers is equal to a quantity of the subsets of the second resource set; or the quantity of the index numbers is specified in a protocol, or pre-configured, or configured by a control node, or indicated by a control node, or determined based on a second preset policy.

In some embodiments, the second preset policy includes at least one of the following content items:

the group information of the user equipment;

the quantity of the subsets of the second resource set.

In some embodiments, the determining module is configured to:

determine the first resource set based on at least one piece of the following information:

an in-group identity ID of the user equipment;

a source ID of the user equipment;

a destination user equipment ID;

time information;

a sidelink network ID;

geographic location information; or a resource pool ID.

In some embodiments, the processing module includes:

a first determining submodule, configured to determine a resource selection window;

a second determining submodule, configured to determine a third resource set according to the first resource set and the resource selection window; and a processing submodule, configured to select the target resource from the third resource set.

In some embodiments, the user equipment further includes:

a sending module, configured to send data on the target resource according to a power control parameter corresponding to the first resource set.

The user equipment 400 can implement the processes implemented by the user equipment in the method embodiments of FIG. 1 to FIG. 3. To avoid repetition, details are not described herein again. In the embodiments of the present disclosure, during autonomous resource selection, the user equipment, by determining the first resource set that is a subset of the second resource set, can avoid a resource selection conflict and improve reliability of communications when selecting the target resource according to the first resource set.

Figure 5:
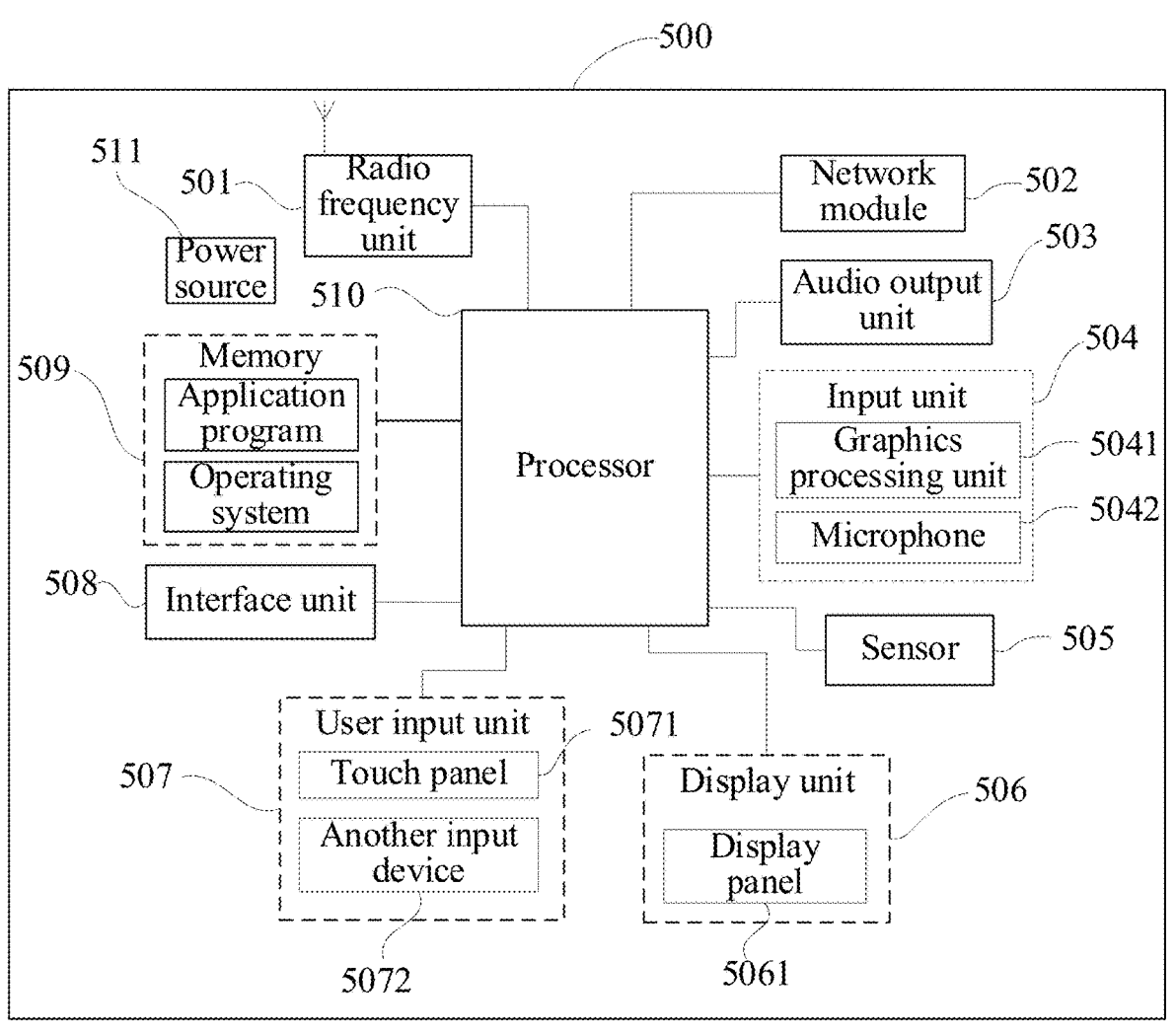
FIG. 5 is a schematic structural diagram of a user equipment according to another embodiment of the present disclosure.

FIG. 5 is a schematic structural diagram of hardware of a user equipment configured to implement the embodiments of the present disclosure. The user equipment 500 includes, but is not limited to, components such as a radio frequency unit 501, a network module 502, an audio output unit 503, an input unit 504, a sensor 505, a display unit 506, a user input unit 507, an interface unit 508, a memory 509, a processor 510, and a power source 511. A person skilled in the art may understand that the structure of the user equipment shown in FIG. 5 does not constitute a limitation to the user equipment, and the user equipment may include more components or fewer components than those shown in the figure, or some components may be combined, or a different component deployment may be used. In the embodiments of the present disclosure, the user equipment includes but is not limited to a mobile phone, a tablet computer, a notebook computer, a handheld computer, an in-vehicle terminal, a wearable device, and a pedometer.

The processor 510 is configured to determine a first resource set, where the first resource set is a subset of a second resource set, and select a target resource according to the first resource set.

In view of the above, during autonomous resource selection, the user equipment, by determining the first resource set that is a subset of the second resource set, can avoid a resource selection conflict and improve reliability of communications when selecting the target resource according to the first resource set.

It should be understood that in the embodiments of the present disclosure, the radio frequency unit 501 is configured to receive and send signals during an information receiving and sending process or a call process. In some embodiments, the radio frequency unit 501 is configured to receive downlink data from a base station, send the downlink data to the processor 510 for processing, and send uplink data to the base station. Generally, the radio frequency unit 501 includes, but is not limited to, an antenna, at least one amplifier, a transceiver, a coupler, a low noise amplifier, a duplexer, and the like. In addition, the radio frequency unit 501 may further communicate with another device through a wireless communications system and network.

The user equipment provides the user with wireless broadband Internet access by using the network module 502, such as helping the user to send and receive an email, browse a web page, and access streaming media.

The audio output unit 503 may convert audio data received by the radio frequency unit 501 or the network module 502 or stored on the memory 509 into an audio signal and output the audio signal as sound. In addition, the audio output unit 503 may further provide an audio output that is related to a particular function executed by the user equipment 500 (for example, a call signal receiving sound or a message receiving sound). The audio output unit 503 includes a speaker, a buzzer, a receiver, and the like.

The input unit 504 is configured to receive an audio signal or a video signal. The input unit 504 may include a Graphics Processing Unit (GPU) 5041 and a microphone 5042. The graphics processing unit 5041 performs processing on image data of a static picture or a video that is obtained by an image acquisition device (for example, a camera) in a video acquisition mode or an image acquisition mode. An image frame that has been processed may be displayed on the display unit 506. An image frame that has been processed by the graphics processing unit 5041 may be stored in the memory 509 (or another storage medium) or sent by using the radio frequency unit 501 or the network module 502. The microphone 5042 may receive a sound, and can process the sound into audio data. The processed audio data may be converted, in a phone talk mode, into a format that may be sent to a mobile communications base station via the radio frequency unit 501 for output.

The user equipment 500 may further include at least one sensor 505 such as an optical sensor, a motion sensor, and other sensors. In some embodiments, the optical sensor includes an ambient light sensor and a proximity sensor, where the ambient light sensor may adjust luminance of a display panel 5061 according to the luminance of the ambient light, and the proximity sensor may switch off the display panel 5061 and/or backlight when the user equipment 500 is moved to the ear. As one type of motion sensor, an acceleration sensor may detect magnitude of accelerations in various directions (generally on three axes), and detect the magnitude and direction of gravity at rest. The acceleration sensor is configured to recognize the attitude of the user equipment (such as, switching between landscape orientation and portrait orientation, related gaming, and magnetometer attitude calibration), a function related to vibration recognition (such as a pedometer and a knock), and the like. The sensor 505 may further include a fingerprint sensor, a pressure sensor, an iris sensor, a molecular sensor, a gyroscope, a barometer, a hygrometer, a thermometer, an infrared sensor, and the like, which will not be described in detail herein.

The display unit 506 is configured to display information inputted by the user or information provided for the user. The display unit 506 may include a display panel 5061. The display panel 5061 may be configured by using a Liquid Crystal Display (LCD), an Organic Light-Emitting Diode (OLED), or the like.

The user input unit 507 may be configured to receive input digit or character information, and generate key signal input related to the user setting and function control of the user equipment. In some embodiments, the user input unit 507 includes a touch panel 5071 and another input device 5072. The touch panel 5071, also called a touch screen, is configured to collect a touch operation made by the user on or in proximity to the touch panel 5071 (such as an operation made by the user on or in proximity to the touch panel 5071 through any appropriate object or attachment, such as a finger or a stylus). The touch panel 5071 may include two parts: a touch detection apparatus and a touch controller. The touch detection apparatus is configured to detect a touch position of the user and a signal generated due to the touch operation, and transmit the signal to the touch controller. The touch controller is configured to receive touch information from the touch detection apparatus, convert the touch information into coordinates of a touch point, transmit the coordinates to the processor 510, and receive and execute a command sent from the processor 510. In addition, the touch panel 5071 may be implemented by using various types, such as a resistive type, a capacitive type, an infrared type, and a surface acoustic wave type. In addition to the touch panel 5071, the user input unit 507 may further include the another input device 5072. In some embodiments, the another input device 5072 may include, but not limited to, a physical keyboard, a functional key (such as a volume control key or a switch key), a track ball, a mouse, and a joystick, which are not described herein in detail.

Further, the touch panel 5071 may cover the display panel 5061. When detecting a touch operation made on or in proximity to the touch panel 5071, the touch panel 5071 transmits the touch operation to the processor 510 so as to determine a type of a touch event. Then, the processor 510 provides a corresponding visual output on the display panel 5061 according to the type of the touch event. Although, in FIG. 5, the touch panel 5071 and the display panel 5061 are used as two separate parts to implement input and output functions of the user equipment, in some embodiments, the touch panel 5071 and the display panel 5061 may be integrated to implement the input and output functions of the user equipment, which are not limited herein.

The interface unit 508 is an interface for connecting an external apparatus to the user equipment 500. For example, the external apparatus may include a wired or wireless headset port, an external power supply (or a battery charger) port, a wired or wireless data port, a storage card port, a port used to connect an apparatus having an identification module, an audio input/output (I/O) port, a video I/O port, an earphone port, and the like. The interface unit 508 may be configured to receive an input (for example, data information or power) from an external apparatus, and transmit the received input to one or more elements in the user equipment 500, or may be configured to transmit data between the user equipment 500 and the external apparatus.

The memory 509 may be configured to store a software program and various data. The memory 509 may mainly include a program storage area and a data storage area. The program storage area may store an operating system, an application program required by at least one function (for example, a sound playback function and an image display function), and the like. The data storage area may store data (for example, audio data and an address book) created according to the use of the mobile phone, and the like. In addition, the memory 509 may include a high-speed random access memory, and may further include a nonvolatile memory, such as at least one magnetic disk storage device, a flash memory, or another volatile solid-state storage device.

The processor 510 is a control center of the user equipment, and is connected to various parts of the entire user equipment by using various interfaces and lines. By running or executing the software program and/or module stored in the memory 509, and invoking data stored in the memory 509, the processor 510 performs various functions and data processing of the user equipment, thereby performing overall monitoring on the user equipment. The processor 510 may include one or more processing units. In some embodiments, the processor 510 may integrate an application processor and a modem processor. The application processor mainly processes an operating system, a user interface, an application program, and the like. The modem processor mainly processes wireless communications. It may be understood that the foregoing modem processor may not be integrated into the processor 510.

The user equipment 500 may further include the power supply 511 (such as a battery) for supplying power to the components. In some embodiments, the power supply 511 may be logically connected to the processor 510 by a power management system, thereby implementing functions such as charging, discharging, and power consumption management by using the power management system.

In addition, the user equipment 500 includes some functional modules not shown, which are not described in detail herein.

For example, the embodiments of the present disclosure further provide a user equipment, including a processor, a memory, and a computer program stored in the memory and executable by the processor. The computer program, when executed by the processor, implements the processes of the embodiments of the foregoing resource selection method, and the same technical effects can be achieved. To avoid repetition, details are not described herein again.

The embodiments of the present disclosure further provide a computer-readable storage medium storing a computer program. The computer program is executable by a processor to implement the processes of the embodiments of the foregoing resource selection method, and the same technical effects can be achieved. To avoid repetition, details are not described herein again. The computer-readable storage medium is, for example, a Read-Only Memory (ROM), a Random Access Memory (RAM), a magnetic disk, an optical disc or the like.

It may be understood that the embodiments described in the present disclosure may be implemented by using hardware, software, firmware, middleware, microcode, or a combination thereof. For hardware implementation, a module, a unit, a submodule, a subunit, or the like, may be implemented in one or more Application Specific Integrated Circuits (ASICs), a Digital Signal Processor (DSP), a Digital Signal Processing Device (DSPD), a Programmable Logic Device (PLD), a Field-Programmable Gate Array (FPGA), a general purpose processor, a controller, a micro-controller, a microprocessor, and other electronic units configured to execute the functions described in this application, or a combination of the above.

It should be noted that the term "include", "comprise" or any other variation thereof in this specification is intended to cover a non-exclusive inclusion, which specifies the presence of stated processes, methods, objects, or apparatuses, but does not preclude the presence or addition of one or more other processes, methods, objects, or apparatuses. Unless otherwise specified, an element limited by the sentence "include a/an . . . " does not exclude other same elements existing in the process, the method, the article, or the device that includes the element.

Through the descriptions of the foregoing implementations, a person skilled in the art may clearly understand that the methods in the foregoing embodiments may be implemented by means of software and a necessary general hardware platform, and may also be implemented by hardware, but in many cases, the former manner is a better implementation. Based on such an understanding, the technical solutions of the present disclosure essentially, or the part contributing to the prior art, may be presented in the form of a software product. The computer software product is stored in a storage medium (for example, a ROM/RAM, a magnetic disk, or an optical disc) including several instructions to enable a terminal (which may be a mobile phone, a computer, a server, an air conditioner, a network device, or the like) to perform the methods described in the embodiments of the present disclosure.

The embodiments of the present disclosure are described above with reference to the accompanying drawings. However, the present disclosure is not limited to the foregoing specific implementations. The foregoing specific implementations are illustrative instead of limitative. Enlightened by the present disclosure, a person of ordinary skill in the art can make many forms without departing from the idea of the present disclosure and the scope of protection of the claims. All of the forms fall within the protection of the present disclosure.

What is claimed is:

1. A resource selection method, performed by a user equipment, comprising:

selecting a first resource set from a second resource set; and selecting a target resource according to the first resource set, wherein selecting the target resource according to the first resource set comprises:

determining a resource selection window, determining a third resource set according to the first resource set and the resource selection window, and selecting the target resource from the third resource set.

2. The resource selection method according to claim 1, wherein the first resource set is a subset of the second resource set divided based on at least one of the following parameters:

a subset size;

a start position;

a target quantity; or a period.

3. The resource selection method according to claim 2, wherein the at least one parameter is specified in a protocol, or pre-configured, or configured by a control node, or indicated by a control node, or determined based on a first preset policy.

4. The resource selection method according to claim 3, wherein the first preset policy comprises at least one of the following content items:

group information of the user equipment;

a quantity of sidelink radio resource control connections of the user equipment; or a size of to-be-transmitted data of the user equipment.

5. The resource selection method according to claim 1, wherein each subset of the second resource set has a corresponding index number.

6. The resource selection method according to claim 5, wherein a quantity of the index numbers is equal to a quantity of the subsets of the second resource set; or the quantity of the index numbers is specified in a protocol, or pre-configured, or configured by a control node, or indicated by a control node, or determined based on a second preset policy.

7. The resource selection method according to claim 6, wherein the second preset policy comprises at least one of the following content items:

group information of the user equipment; or the quantity of the subsets of the second resource set.

8. The resource selection method according to claim 1, wherein selecting the first resource set from the second resource set based on at least one piece of the following information:

an in-group identity (ID) of the user equipment;

a source ID of the user equipment;

a destination user equipment ID;

time information;

a sidelink network ID;

geographic location information; or a resource pool ID.

9. The resource selection method according to claim 1, wherein after the selecting a target resource according to the first resource set, the method further comprises:

sending data on the target resource according to a power control parameter corresponding to the first resource set.

10. A user equipment, comprising a memory having a computer program stored thereon; and a processor, wherein the computer program, when executed by the processor, causes the processor to perform a resource selection method, comprising:

selecting a first resource set from a second resource set; and selecting a target resource according to the first resource set, wherein selecting the target resource according to the first resource set comprises:

determining a resource selection window, determining a third resource set according to the first resource set and the resource selection window, and selecting the target resource from the third resource set.

11. The user equipment according to claim 10, wherein the first resource set is a subset of the second resource set divided based on at least one of the following parameters:

a subset size;

a start position;

a target quantity; or a period.

12. The user equipment according to claim 11, wherein the at least one parameter is specified in a protocol, or pre-configured, or configured by a control node, or indicated by a control node, or determined based on a first preset policy.

13. The user equipment according to claim 12, wherein the first preset policy comprises at least one of the following content items:

group information of the user equipment;

a quantity of sidelink radio resource control connections of the user equipment; or a size of to-be-transmitted data of the user equipment.

14. The user equipment according to claim 10, wherein each subset of the second resource set has a corresponding index number.

15. The user equipment according to claim 14, wherein a quantity of the index numbers is equal to a quantity of the subsets of the second resource set; or the quantity of the index numbers is specified in a protocol, or pre-configured, or configured by a control node, or indicated by a control node, or determined based on a second preset policy.

16. The user equipment according to claim 15, wherein the second preset policy comprises at least one of the following content items:

group information of the user equipment; or the quantity of the subsets of the second resource set.

17. The user equipment according to claim 10, wherein selecting the first resource set from the second resource set based on at least one piece of the following information:

an in-group identity (ID) of the user equipment;

a source ID of the user equipment;

a destination user equipment ID;

time information;

a sidelink network identity (ID);

geographic location information; or a resource pool ID.

18. A non-transitory computer-readable storage medium, storing a computer program, wherein the computer program, when executed by a processor, causes the processor to perform a resource selection method, comprising:

selecting a first resource set from a second resource set; and selecting a target resource according to the first resource set, wherein selecting the target resource according to the first resource set comprises:

determining a resource selection window, determining a third resource set according to the first resource set and the resource selection window, and selecting the target resource from the third resource set.

* * * * *